United States Patent
Kim et al.

(10) Patent No.: US 11,711,582 B2
(45) Date of Patent: Jul. 25, 2023

(54) ELECTRONIC APPARATUS AND CONTROL METHOD THEREOF

(71) Applicant: SAMSUNG ELECTRONICS CO., LTD., Suwon-si (KR)

(72) Inventors: Cheolwoo Kim, Suwon-si (KR); Daewon Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 32 days.

(21) Appl. No.: 17/541,493

(22) Filed: Dec. 3, 2021

(65) Prior Publication Data

US 2022/0182723 A1 Jun. 9, 2022

(30) Foreign Application Priority Data

Dec. 3, 2020 (KR) .................. 10-2020-0167512
Sep. 28, 2021 (KR) .................. 10-2021-0128171

(51) Int. Cl.
*H04N 21/466* (2011.01)
*H04N 21/482* (2011.01)
(Continued)

(52) U.S. Cl.
CPC ....... *H04N 21/4667* (2013.01); *G06F 40/279* (2020.01); *H04N 21/4532* (2013.01); *H04N 21/4826* (2013.01)

(58) Field of Classification Search
None
See application file for complete search history.

(56) References Cited

U.S. PATENT DOCUMENTS 10,491,952 B2 * 11/2019 Hsu ................ H04N 21/4826
2005/0076365 A1 4/2005 Popov et al.
(Continued)

FOREIGN PATENT DOCUMENTS

JP 2012-15917 A 1/2012
KR 101286427 B1 7/2013
(Continued)

OTHER PUBLICATIONS

International Search Report and Written Opinion (PCT/ISA/210 and PCT/ISA/237) dated Mar. 25, 2022 issued by the International Searching Authority in International Application No. PCT/KR2021/018103.

*Primary Examiner* — James R Marandi
(74) *Attorney, Agent, or Firm* — Sughrue Mion, PLLC

(57) ABSTRACT

An electronic apparatus includes a processor. The processor is configured to: obtain information about weighted values respectively assigned to a plurality of items having values that represent content features of a plurality of pieces of content, wherein the weighted values are assigned as higher weight values to items corresponding to the content features preferred by according to genres of content; identify a user content viewed by a user of the electronic apparatus; calculate similarities in values of the plurality of items, respectively, between a plurality of pieces of recommendable content and the user content, respectively; calculate recommendation scores of the plurality of pieces of content, based on the calculated similarities and the weighted values assigned to the items according to the genres; and perform a recommendation operation for one or more content pieces, of which the calculated recommendation score is equal to or higher than a preset ranking.

20 Claims, 11 Drawing Sheets

(51) Int. Cl.
  *H04N 21/45*     (2011.01)
  *G06F 40/279*    (2020.01)

(56) References Cited

U.S. PATENT DOCUMENTS

| | | | |
|---|---|---|---|
| 2012/0089996 A1* | 4/2012 | Ramer | H04H 60/46 |
| | | | 725/14 |
| 2012/0311637 A1* | 12/2012 | Anthru | H04N 21/41265 |
| | | | 725/44 |
| 2016/0088358 A1 | 3/2016 | Garcia Navarro | |
| 2018/0046624 A1 | 2/2018 | Chen et al. | |
| 2018/0234732 A1* | 8/2018 | Galuten | H04N 21/4668 |
| 2019/0205402 A1* | 7/2019 | Sernau | G06Q 50/01 |
| 2021/0051372 A1* | 2/2021 | Jeon | H04N 21/4826 |
| 2022/0147870 A1 | 5/2022 | Agarwal et al. | |

FOREIGN PATENT DOCUMENTS

| | | |
|---|---|---|
| KR | 101875230 B1 | 8/2018 |
| KR | 10-2020-0092465 A | 8/2020 |

\* cited by examiner

FIG. 6

| GENRE | FEATURES OF HIGHLY PREFERRED CONTENT | ITEMS CORRESPONDING TO FEATURES |
|---|---|---|
| SPORTS | KIND OF SPORTS, LEAGUE, TEAM | sub_genre, title |
| NEWS | CHANNEL, SPECIFIC NEWS PROGRAM | channel_number, program_id |
| MOVIE | GENRE | sub_genre |
| DRAMA | SERIES, GENRE | series_id, sub_genre |
| ENTERTAINMENT | SERIES | series_id, title |
| ANIMATION | SERIES, CHANNEL, HERO/HEROINE | series_id, channel_number, title, description |
| MUSIC | PROGRAM, SERIES | program_id, series_id |

FIG. 7

| | sub_genre | program_id | series_id | title | channel_number | description |
|---|---|---|---|---|---|---|
| SPORTS | 0.5 | | | 0.2 | 0.1 | |
| NEWS | | 0.2 | | | 0.5 | |
| MOVIE | 0.7 | | 0.2 | | 0.1 | |
| DRAMA | 0.3 | | 0.5 | 0.5 | | |
| ENTERTAINMENT | | | 0.4 | 0.2 | 0.2 | 0.1 |
| ANIMATION | | | | | | |
| MUSIC | | 0.5 | 0.5 | | | |

FIG. 8

| VIEW START TIME | VIEW END TIME | VIEW CONTENT TITLE | GENRE | CONTENT ID |
|---|---|---|---|---|
| 2020-8-26 6:54 PM | 2020-8-26 7:25 PM | OOOO Cup Playoff | hockey | ba00000000003933376 |
| 2020-9-3 7:46 PM | 2020-9-3 8:11 PM | OOOO Tonight | news | ba00000000022274637 |
| 2020-8-28 11:06 PM | 2020-8-28 11:27 PM | OOO Baseball | baseball | ba00000000004208760 |
| 2020-8-31 5:00 PM | 2020-8-31 5:18 PM | OOO Playoff | basketball | ba00000000032665850 |
| 2020-8-27 1:21 PM | 2020-8-27 1:40 PM | OOO Live | football | ba00000000029546750 |

ELECTRONIC APPARATUS AND CONTROL METHOD THEREOF

CROSS-REFERENCE TO RELATED APPLICATION(S)

This application is based on and claims priority under 35 U.S.C. § 119 to Korean Patent Application No. 10-2020-0167512 filed on Dec. 3, 2020 and Korean Patent Application No. 10-2021-0128171 filed on Sep. 28, 2021, in the Korean Intellectual Property Office, the disclosures of which are incorporated by reference herein in their entireties.

BACKGROUND

1. Field

The disclosure relates to an electronic apparatus, which displays a content image by reproducing content selected among multiple pieces of provided content, and a control method thereof, and more particularly to an electronic apparatus, which selects content suitable for a user among multiple pieces of provided content and recommends the selected content to the user, and a control method thereof.

2. Description of Related Art

To compute and process predetermined information in accordance with certain processes, an electronic apparatus generally includes a central processing unit (CPU), a chipset, a memory, and the like electronic components for the computation. Such an electronic apparatus may be variously classified in accordance with what information will be processed and what it is used for. For example, the electronic apparatus is classified as an information processing apparatus such as a personal computer (PC), a server or the like for processing general information; an image processing apparatus for processing image data; an audio apparatus for audio process; home appliances for miscellaneous household chores; etc. The image processing apparatus may be a display apparatus that displays an image based on processed image data on its own display panel. The electronic apparatus provides a user interface (UI) allowing a user to select predetermined content among numerous pieces of content providable from the server or the external apparatus or stored therein, and displays a content image by reproducing the content selected through the UI.

With expansion of content providing service and increase in number of pieces of content providable by multiple content providers, it matters what content will be recommended to a user among a plurality of various pieces of providable content (hereinafter, referred to as "available content"). For example, it is practically difficult for the electronic apparatus to show options of all pieces of available content within the UI. Therefore, the electronic apparatus selects a plurality of pieces of content, which are expected to be highly preferred by a user among the pieces of available content, and displays a UI including options of the plurality of selected pieces of content. Thus, the electronic apparatus has improved convenience for a user in selecting content because it provides the options to a user as well as guides recommendation content preferred by the user.

There have been proposed various methods of identifying what content is highly preferred by a user among the pieces of available content. However, with rapid increase in the amount of provided content, such a proposed method may select content, which is unsuitable for a user, as the recommendation content. For example, there is a method of preferentially recommending a channel a user spends a lot of time to view based on the user's view history. By this method, a channel or program frequently viewed by a user is selectable, but a channel or program having no history of being viewed is not selectable as the recommendation content.

Accordingly, the electronic apparatus may need a method of selecting the recommendation content, to which a user's preference is more accurately estimated and reflected (in other words, which more accurately suits a user's tendencies), among the pieces of available content.

SUMMARY

According to an aspect of the disclosure, there is provided an electronic apparatus including: a processor configured to: obtain information about weighted values respectively assigned to a plurality of items having values that represent content features of a plurality of pieces of content, wherein the weighted values are assigned as higher weight values to items corresponding to the content features preferred by a plurality of users according to genres of content among the plurality of items; identify a user content viewed by a user of the electronic apparatus, based on a view history of the user; calculate similarities in values of the plurality of items, respectively, between a plurality of pieces of recommendable content and the user content, respectively; calculate recommendation scores of the plurality of pieces of content, based on the calculated similarities and the weighted values assigned to the items according to the genres; and perform a recommendation operation for one or more content pieces, of which the calculated recommendation score is equal to or higher than a preset ranking, among the plurality of pieces of content.

The processor is further configured to: calculate similarities by comparing values according to corresponding items among the plurality of items between a first content among the plurality of pieces of recommendable content and the user content; identify the weighted values for the corresponding items; and calculate a value, which is obtained by summing the similarities according to the corresponding items to which the identified weighted values are reflected, as a recommendation score of the first content.

A value of a first item among the corresponding items includes a number, and a similarity according to the first item between the first content and the user content becomes higher as a difference between the value of the first item in the first content and the value of the first item in the user content decreases.

A value of a second item among the corresponding items includes a text, and a similarity according to the second item between the first content and the user content becomes higher as the value of the second item in the first content and the value of the second item in the user content have more keywords in common.

The processor is further configured to identify content, which has a highest view frequency among pieces of content included in the view history, as the user content.

The processor is further configured to identify a genre of which content has a highest view frequency among pieces of content included in the view history, and identify the content of the identified genre as the user content.

The electronic apparatus further incudes a display, wherein the processor is further configured to display, on the display, a user interface through which the one or more content pieces, of which the recommendation scores are ranked higher than or equal to the preset ranking, are provided to be selectable among the plurality of pieces of content.

The processor is further configured to identify the plurality of pieces of content based on electronic program guide information.

According to an aspect of the disclosure, there is provided a method of controlling an electronic apparatus, the method including: obtaining information about weighted values respectively assigned to a plurality of items having values that represent content features of a plurality of pieces of content, wherein the weighted values are assigned as higher weight values to items corresponding to the content features preferred by a plurality of users according to genres of content among the plurality of items; identifying a user content viewed by a user of the electronic apparatus based on a view history of the user; calculating recommendation scores of the plurality of pieces of content, based on similarities in values of the plurality of items, respectively, between a plurality of pieces of recommendable content and the user content, respectively, and the weighted values assigned to the items according to the genres; and performing a recommendation operation for one or more content pieces, of which the calculated recommendation score is equal to or higher than a preset ranking, among the plurality of pieces of recommendable content.

The calculating the recommendation scores of the plurality of pieces of content further includes: calculating similarities by comparing values according to corresponding items among the plurality of items between a first content among the plurality of pieces of recommendable content and the user content; identifying the weighted values corresponding to the corresponding items; and calculating a value, which is obtained by summing the similarities according to the corresponding items to which the identified weighted values are reflected, as a recommendation score of the first content.

A value of a first item among the corresponding items includes a number, and a similarity according to the first item between the first content and the user content becomes higher as a difference between the value of the first item in the first content and the value of the first item in the user content decreases.

A value of a second item among the corresponding items includes a text, and a similarity according to the second item between the first content and the user content becomes higher as the value of the second item in the first content and the value of the second item in the user content have more keywords in common.

The identifying the user content further includes: identifying content, which has a highest view frequency among pieces of content included in the view history, as the user content.

The identifying the user content further includes: identifying a genre of which content has a highest view frequency among pieces of content included in the view history; and identifying the content of the identified genre as the user content.

The performing the recommendation operation further includes: displaying a user interface through which the one or more content pieces, of which the recommendation scores are ranked higher than or equal to the preset ranking, are provided to be selectable among the plurality of pieces of content.

According to an aspect of the disclosure, there is provided a non-transitory computer-readable storage medium having recorded thereon at least one instruction which, when executed by at least one processor, causes the at least one processor to execute a method for controlling an electronic apparatus, the method including: obtaining information about weighted values respectively assigned to a plurality of items having values that represent content features of a plurality of pieces of content, wherein the weighted values are assigned as higher weight values to items corresponding to the content features preferred by a plurality of users according to genres of content among the plurality of items; identifying a user content viewed by a user of the electronic apparatus based on a view history of the user; calculating recommendation scores of the plurality of pieces of content, based on similarities in values of the plurality of items, respectively, between a plurality of pieces of recommendable content and the user content, respectively, and the weighted values assigned to the items according to the genres; and performing a recommendation operation for one or more content pieces, of which the calculated recommendation score is equal to or higher than a preset ranking, among the plurality of pieces of recommendable content.

The non-transitory computer-readable storage medium, wherein the calculating the recommendation scores of the plurality of pieces of content further includes: calculating similarities by comparing values according to corresponding items among the plurality of items between a first content among the plurality of pieces of recommendable content and the user content; identifying the weighted values corresponding to the corresponding items; and calculating a value, which is obtained by summing the similarities according to the corresponding items to which the identified weighted values are reflected, as a recommendation score of the first content.

The non-transitory computer-readable storage medium, wherein a value of a first item among the corresponding items includes a number, and a similarity according to the first item between the first content and the user content becomes higher as a difference between the value of the first item in the first content and the value of the first item in the user content decreases.

The non-transitory computer-readable storage medium, wherein a value of a second item among the corresponding items includes a text, and a similarity according to the second item between the first content and the user content becomes higher as the value of the second item in the first content and the value of the second item in the user content have more keywords in common.

The non-transitory computer-readable storage medium, wherein the identifying the user content further includes: identifying content, which has a highest view frequency among pieces of content included in the view history, as the user content.

BRIEF DESCRIPTION OF THE DRAWINGS

The above and other aspects, features and advantages of certain embodiments of the present disclosure will be more apparent from the following description, taken in conjunction with the accompanying drawings, in which:

FIG. 6 is a table showing features of preference according to genres of content, and items corresponding to the features according to an embodiment;

FIG. 7 is a table showing that items are weighted according to genres according to an embodiment;

FIG. 8 is a table showing an example of a user's view history of an electronic apparatus according to an embodiment;

DETAILED DESCRIPTION

Below, embodiments will be described in detail with reference to accompanying drawings. Further, the embodiments described with reference to the accompanying drawings are not exclusive to each other unless otherwise mentioned, and a plurality of embodiments may be selectively combined within one apparatus. The combination of these plural embodiments may be discretionally selected and applied to realize the present inventive concept by a person having an ordinary skill in the art.

In the description of the embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the disclosure.

Further, a term "at least one" among a plurality of elements in the disclosure represents not only all the elements but also each one of the elements, which excludes the other elements or all combinations of the elements.

Figure 1:
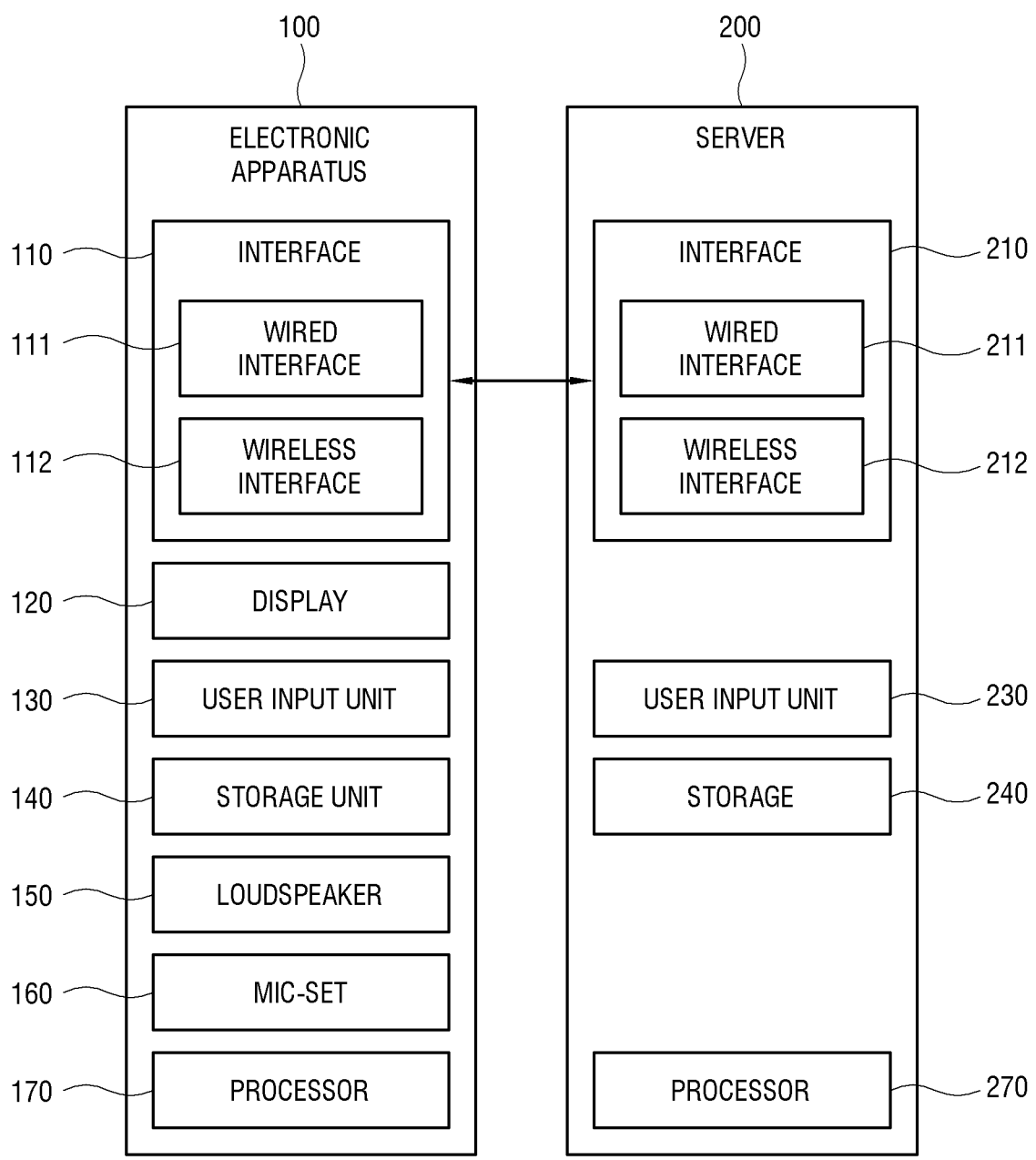
FIG. 1 is a block diagram of an electronic apparatus according to an embodiment.

FIG. 1 is a block diagram of an electronic apparatus.

As shown in FIG. 1, an electronic apparatus 100 according to an embodiment may reproduce and provide content provided from various external apparatuses to a user. The electronic apparatus 100 may independently perform operations to be described later according to an embodiment. Alternatively, the electronic apparatus 100 may be designed to perform the operations according to an embodiment in cooperation with a connected server 200.

The electronic apparatus 100 may be embodied by various kinds of apparatuses, for example including a stationary display apparatus such as a television (TV), a monitor, a digital signage, a digital whiteboard, an electronic frame, etc.; an image processing apparatus such as a set-top box, an optical media player, etc.; an information processing apparatus such as a computer; a mobile apparatus such as a smartphone, a tablet computer, etc.; an image taking apparatus such as a camera, a camcorder, etc.; home appliances such as a washing machine, a refrigerator, a clothes manager, an air conditioner, an electric cleaner, etc.; a wearable device provided to be worn on a user's body; a communication device such as a hub, a gateway, a router, an access point (AP), etc.

The electronic apparatus 100 and the server 200 include various hardware elements for operations. In this embodiment it will be described that the electronic apparatus 100 is a TV. However, the electronic apparatus 100 may be embodied by various kinds of apparatuses described as above, and the features described below may vary depending on the kinds of electronic apparatus 100.

The electronic apparatus 100 may include an interface 110. The interface 110 includes an interface circuit through which the electronic apparatus 100 performs communication with various external apparatuses such as the server 200 and transmits and receives data. The interface 110 may include at least one of one or more wired interfaces 111 for wired communication, or one or more wireless interface 112 for wireless communication according to connection types.

The wired interface 111 includes a connector or port to which a cable of previously defined transmission standards is connected. For example, the wired interface 111 includes a port connecting with a terrestrial or satellite antenna to receive a broadcast signal or connecting with a cable for cable broadcasting. Further, the wired interface 111 includes ports to which cables of various wired transmission standards such as high definition multimedia interface (HDMI), DisplayPort (DP), digital video interactive (DVI), component, composite, S-video, thunderbolt, and the like to connect with various image processing apparatuses. Further, the wired interface 111 includes a port of universal serial bus (USB) standards to connect with a USB device. Further, the wired interface 111 includes an optical port to which an optical cable is connected. Further, the wired interface 111 includes an audio input port to which an external microphone is connected, and an audio output port to which a headset, an earphone, a loudspeaker etc. is connected. Further, the wired interface 111 includes an Ethernet port connected to a gateway, a router, a hub, etc. for connection with the WAN.

The wireless interface 112 includes an interactive communication circuit including at least one of elements such as a communication module, a communication chip, etc. corresponding to various kinds of wireless communication protocols. For example, the wireless interface 112 includes a Wi-Fi communication chip for wireless communication with the AP based on Wi-Fi; a communication chip for wireless communication based on Bluetooth, Zigbee, Z-Wave, Wireless HD, wireless gigabits (WiGig), near field communication (NFC), etc.; an infrared (IR) module for IR communication; a mobile communication chip for mobile communication with a mobile device; etc.

The electronic apparatus 100 may include a display 120. The display 120 forms a screen for displaying an image based on an image signal processed by a processor 170. The display 120 includes a display panel, and the structure of the display panel may be designed variously. For example, the display 120 may include a display panel having a light-receiving structure like liquid crystal, and a backlight unit illuminating the display panel. Alternatively, the display 120 may include a display panel having a self-emissive structure like an organic light emitting diode (OLED). Alternatively, the display 120 may have a structure forming a large screen with tiling combination of a plurality of micro light emitting diode (LED) modules.

The electronic apparatus 100 may include a user input unit 130. The user input unit 130 includes a circuit related to various kinds of user input interfaces to be controlled by a user to thereby receive a user input. The user input unit 130 may be variously configured according to the kinds of electronic apparatus 100, and may for example include a mechanical or electronic button of the electronic apparatus 100, various kinds of sensors, a touch pad, a touch screen installed in the display, etc. Alternatively, the user input unit 130 may include an external input device such as a keyboard, a mouse, a remote controller, etc. which is separated from the electronic apparatus 100 and connected through the interface 110. Alternatively, the electronic apparatus 100 may receive a control signal based on a user input through the interface 110 from the external apparatus such as the mobile apparatus besides the user input unit 130.

The electronic apparatus 100 may include a storage unit 140. The storage unit 140 is configured to store digitalized data. The storage unit 140 includes a nonvolatile storage in which data is retained regardless of whether power is supplied or not, and a volatile memory in which data loaded to be processed by a processor 170 is retained only when power is supplied. The storage includes a flash memory, a hard disc driver (HDD), a solid-state drive (SSD), a read only memory (ROM), etc., and the memory includes a buffer, a random-access memory (RAM), etc.

The electronic apparatus 100 may include a loudspeaker 150. When the processor 170 reproduces predetermined content, the loudspeaker 150 outputs a sound based on an audio signal of the content. The loudspeaker 150 may be installed in the electronic apparatus 100, or may be provided as a separate apparatus. When the loudspeaker 150 is provided as the separate apparatus, the loudspeaker 150 is connected to the interface 110, and the audio signal is transmitted to the loudspeaker 150 through the interface 110.

The electronic apparatus 100 may include a microphone or a mic-set 160. The mic-set 160 generates an audio signal by collecting sounds generated in ambient environments of the electronic apparatus 100, and transmits the audio signal to the processor 170. In this embodiment, the mic-set 160 is an element separated from the user input unit 130, but may be designed to be included in the user input unit 130.

The electronic apparatus 100 may include the processor 170. The processor 170 includes one or more hardware processors achieved by a central processing unit (CPU), a chipset, a buffer, a circuit, etc. which are mounted on a printed circuit board (PCB). Alternatively, the processor 170 may be designed as a system on chip (SoC). When the electronic apparatus 100 is a display apparatus, the processor 170 includes modules corresponding to various processes of a demultiplexer, a decoder, a scaler, an audio digital signal processor (DSP), an amplifier, etc. to display an image based on image content. Here, some or all of such modules may be achieved by the SoC. For example, the demultiplexer, the decoder, the scaler, and the like module related to an image process may be achieved as an image processing SoC, and the audio DSP may be achieved as a chipset separated from the SoC. The processor 170 reproduces predetermined content, thereby outputting a sound of the content through the loudspeaker 150 while displaying an image of the content is displayed on the display 120.

The server 200 also includes hardware elements such as an interface 210, a wired interface 211, a wireless interface 212, a user input unit 230, a storage 240, a processor 270, etc. Such elements of the server 200 are basically similar to those with the same names described in the foregoing electronic apparatus 100, and therefore detailed descriptions thereof will be omitted.

Below, a method, by which the electronic apparatus 100 guides recommendation content to a user, will be described.

Figure 2:
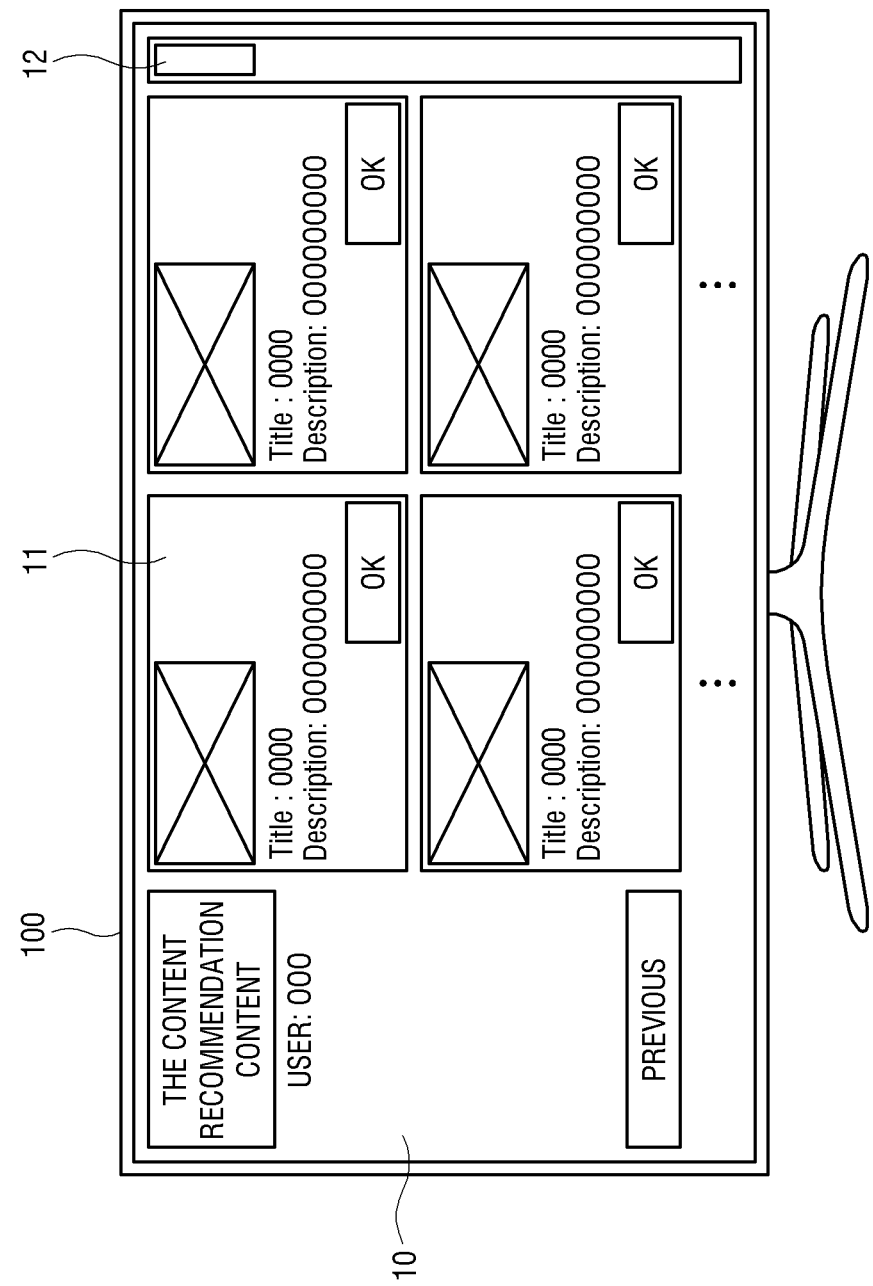
FIG. 2 illustrates that an electronic apparatus displays a user interface (UI) for guiding recommendation content according to an embodiment.

FIG. 2 illustrates that an electronic apparatus displays a user interface (UI) for guiding recommendation content according to an embodiment.

As shown in FIGS. 1 and 2, the electronic apparatus 100 may receive various pieces of content from various content providing apparatuses connectable through the interface 110. The content providing apparatus, the kinds of which are not limited as long as it can provide predetermined content to the electronic apparatus 100, may for example include a server 200 of providing streaming, video-on-demand (VOD) or over-the-top (OTT) services, a transmitter of a broadcasting station, a set-top box, an optical media player, a mobile apparatus, a computer, etc. the electronic apparatus 100 selects one or more pieces of recommendation content, which suits tendencies of a currently identified user (e.g. a user of a currently logged-in account) among various pieces of contents provided by such a content providing apparatus, and provides the selected recommendation content to the user. As a method of providing the recommendation content, the electronic apparatus 100 displays a UI 10 on the display 120.

The UI 10 includes a menu 11 about one or more pieces of recommendation content. The menu 11 for the content shows information about one or more pieces of recommendation content (for example, a thumbnail image corresponding to one scene of the content, a title, a producer, a play time, basic information, etc.), while providing options for the recommendation content. When a user selects a certain menu 11, the electronic apparatus 100 switches over to a detailed information page about the content of the selected menu 11, switches over to a purchase page of the content when the content is available for purchase, displays a control option related to reproduction of the content, or reproduces the content.

When the menus 11 included in the UI 10 are too numerous to be displayed on one screen of the display 120, the electronic apparatus 100 displays a scroll bar 12 at one side on the screen of the display 120 and thus the UI 10 is scrollable through the scroll bar 12.

The electronic apparatus 100 identifies one or more pieces of content suitable for a user's tendencies as the recommendation content among many available pieces of content. Below, a method by which the electronic apparatus 100 identifies one or more pieces of recommendation content among the available pieces of content will be described.

Figure 3:
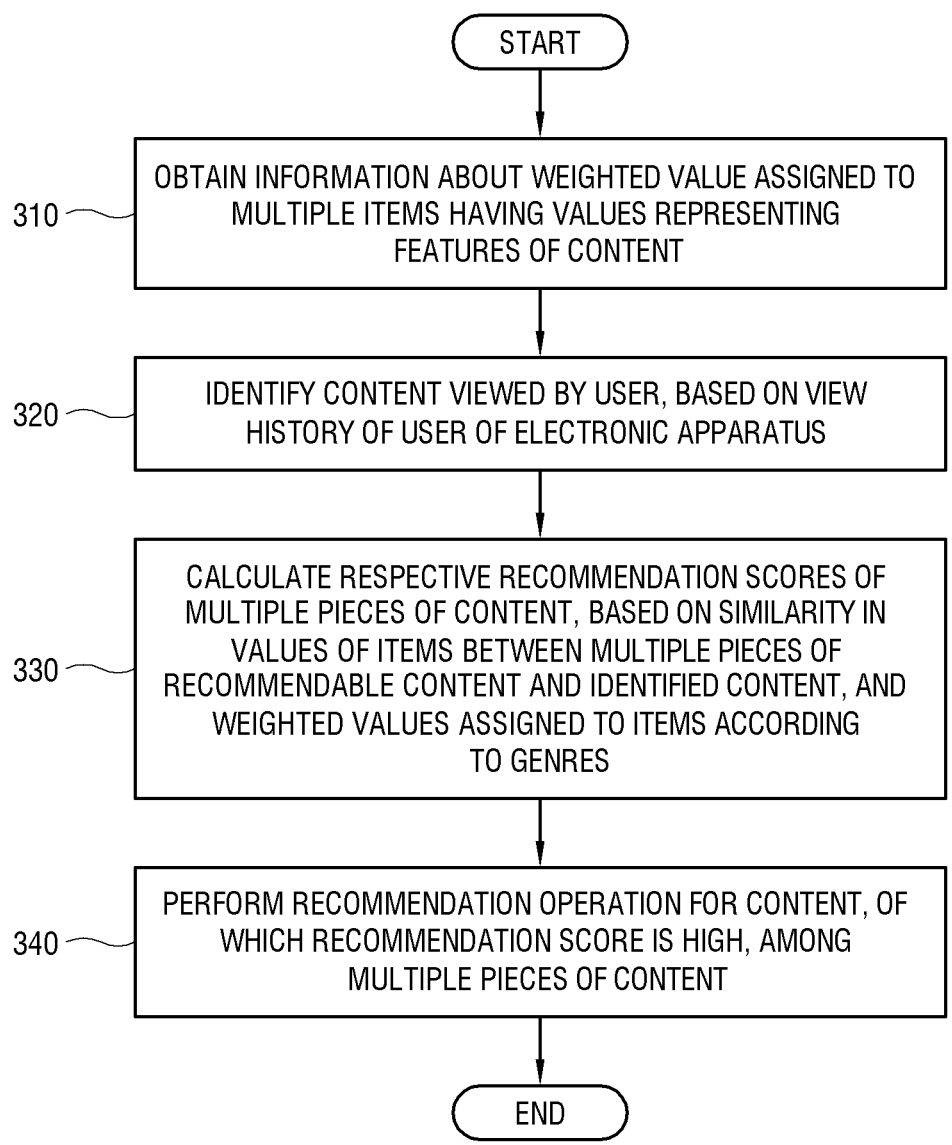
FIG. 3 is a flowchart of a method by which an electronic apparatus identifies recommendation content according to an embodiment.

FIG. 3 is a flowchart of a method by which an electronic apparatus identifies recommendation content according to an embodiment.

As shown in FIGS. 1 and 3, the following operations are performed by the processor 170 of the electronic apparatus 100.

At operation 310 the electronic apparatus 100 obtains information about a weighted value assigned to a plurality of items that have values showing features of content. Here, the weighted value is highly assigned to an item corresponding to the features of the content, which a plurality of users prefers according to the genres of the content, among the plurality of items. In this operation, the plurality of users may for example refer to users of various clients connected for communication with the server 200. The plurality of users may include or exclude a user of the electronic apparatus 100.

Predetermined content includes metadata, and values according to the plurality of items, which are included in the metadata, express the features of the content. Here, the weighted values assigned to the items are varied depending on the genres to which the content belongs, and, the weighted value may be high corresponding to preference of many users in the corresponding genre among others.

At operation 320 the electronic apparatus 100 identifies content viewed by a user, based on a view history of the user of the electronic apparatus 100. Here, one or more pieces of content may be identified.

At operation 330 the electronic apparatus 100 calculates respective recommendation scores of a plurality of pieces of content, based on similarity in the value of each item between the plurality of pieces of recommendable content and the identified content, and the weighted values assigned to the items according to the genres. In this operation, the plurality of pieces of content refers to content which can be obtained by the electronic apparatus 100.

Specifically, the electronic apparatus 100 calculates the similarities according to the items based on comparison in the values of the items between predetermined first content and second content identified as viewed by a user of the electronic apparatus 100 among the plurality of pieces of content, and calculates a recommendation score of the first content by summing the similarities of the items in which the weighted values corresponding to the items are reflected. In this manner, the electronic apparatus 100 calculates the recommendation scores with regard to the plurality of pieces of content.

At operation 340 the electronic apparatus 100 recommends the content, of which the recommendation score is high, among the plurality of pieces of content. Here, one or more pieces of content, of which the recommendation scores are high, may be selected. For example, the electronic apparatus 100 may display a UI for recommending pieces of content, of which the recommendation scores are ranked higher than or equal to a preset ranking, and may display a UI including a menu of recommending content having the recommendation score higher than the preset ranking.

Thus, the electronic apparatus 100 can more easily identify recommendation content, which is suitable for a tendency of a user of the electronic apparatus 100, among the plurality of pieces of content.

Meanwhile, the processor 170 of the electronic apparatus 100 may perform at least a part among data analysis, data process and result information generation based on at least one of machine learning, neural network, deep learning algorithms as a rule-based or artificial intelligence (AI) algorithm in order to perform operations of calculating respective recommendation scores of a plurality of pieces of content based on the information described above. For instance, the information of the operation 320 may be designed by an AI model, and the electronic apparatus 100 may identify the recommendation content by inputting the information about a user's view history to the AI model.

For example, the processor 170 of the electronic apparatus 100 may function as a learner and a recognizer. The learner may perform a function of generating the learned neural network, and the recognizer may perform a function of recognizing (or inferring, predicting, estimating and identifying) the data based on the learned neural network. The learner may generate or update the neural network. The learner may obtain learning data to generate the neural network. For example, the learner may obtain the learning data from the storage of the electronic apparatus 100 or the server 200 or from the outside. The learning data may be data used for learning the neural network, and the data subjected to the foregoing operations may be used as the learning data to train the neural network.

Before training the neural network based on the learning data, the learner may perform a preprocessing operation with regard to the obtained learning data or select data to be used in learning among a plurality of pieces of the learning data. For example, the learner may process the learning data to have a preset format, apply filtering to the learning data, or process the learning data to be suitable for the learning by adding/removing noise to/from the learning data. The learner may use the preprocessed learning data to generate the neural network which is set to perform the foregoing operations.

The learned neural network may include a plurality of neural networks (or layers). The nodes of the plurality of neural networks have weighted values, and the plurality of neural networks may be connected to one another so that an output value of a certain neural network can be used as an input value of another neural network. As an example of the neural network, there are a convolutional neural network (CNN), a deep neural network (DNN), a recurrent neural network (RNN), a restricted Boltzmann machine (RBM), a deep belief network (DBN), a bidirectional recurrent deep neural network (BRDNN) and deep Q-networks.

Meanwhile, the recognizer may obtain target data to carry out the foregoing operations. The target data may be obtained from the storage of the electronic apparatus 100 or the server 200 or from the outside. The target data may be data targeted to be recognized by the neural network. Before applying the target data to the learned neural network, the recognizer may perform a preprocessing operation with respect to the obtained target data, or select data to be used in recognition among a plurality of pieces of target data. For example, the recognizer may process the target data to have a preset format, apply filtering to the target data, or process the target data into data suitable for recognition by adding/removing noise. The recognizer may obtain an output value output from the neural network by applying the preprocessed target data to the neural network. Further, the recognizer may obtain a stochastic value or a reliability value together with the output value.

Below, a detailed method by the electronic apparatus 100 identifies the recommendation content will be described.

Figure 4:
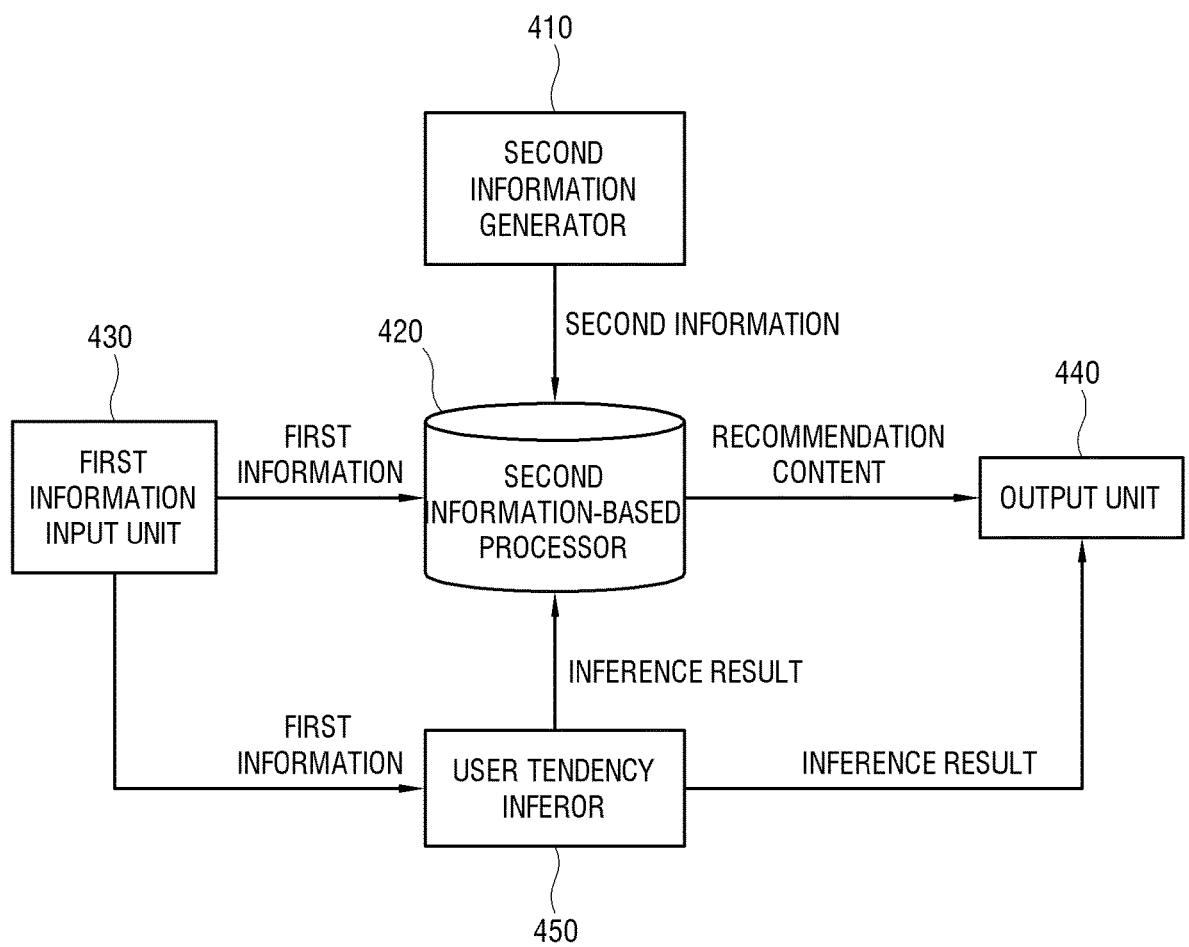
FIG. 4 is a block diagram showing schematic operations of an electronic apparatus according to an embodiment.

FIG. 4 is a block diagram showing schematic operations of an electronic apparatus according to an embodiment.

As shown in FIGS. 1, 3 and 4, the operations according to an embodiment of the disclosure are divided into a plurality of steps corresponding to a second information generator 410, a second information-based processor 420, a first information input unit 430, an output unit 440, and a user tendency inferor 450. In this embodiment, first information refers to information about the user's view history in the operation 320 of FIG. 3, and second information refers to information about the weighted value in the operation 310.

The foregoing elements are classified according to functional operations, which may be performed by the processor 170 of the electronic apparatus 100. However, some operations may be designed to be performed by the server 200. For example, the operations of the second information generator 410 may be related to the operation of the server 200. Among the foregoing operations of FIG. 3, the operation 320 may be related to the operation of the first information input unit 430, the operation 310 may be related to the operation of the second information generator 410, the operation 330 may be related to the operation of the second information-based processor 420, and the operation 340 may be related to the operation of the output unit 440. This embodiment is described including the operations of the user tendency inferor 450, but may be designed not to include the operations of the user tendency inferor 450.

The second information generator 410 generates the second information based on big data of view histories of many users with regard to a plurality of pieces of content. In this embodiment, the second information is provided to identify the recommendation content corresponding to first information among the plurality of pieces of content when predetermined first information is input, as an AI model or AI algorithm based on concept of a decision tree. The second information generator 410 generates or updates the second information through learning based on the foregoing big data.

Here, the plurality of pieces of content each includes metadata that describes the features of the content. The metadata refers to a predetermined value for each of the plurality of items. The features of the corresponding content are expressed with values of such items. Further, each content belongs to one genre, and the genre of the content is expressed with the value of the genre item of the metadata.

In this embodiment, the second information includes weighted values individually assigned corresponding to genres, to which content belongs, with regard to the plurality of items showing the features of the content. When the second information is based on a decision tree-based model, such a weighted value is assigned to each node in the second information, so that a route of data passing between the nodes in the second information can be decided. The route of the data in the second information decides an identification result of the recommendation content.

The second information generator 410 reflects various users' content view histories corresponding to the plurality of genres in the pieces of second information through learning of the big data. For example, the server 200 obtains information about the user's view histories of the plurality of connectable clients from the corresponding clients. Based on each piece of obtained information, the server 200 assigns the weighted value, in which user preference characteristics of multiple clients for a predetermined genre are reflected, to each item of the content that belongs to the corresponding genre. A detailed example of assigning a weighted value to a plurality of items corresponding to a specific genre will be described later.

The second information-based processor 420 identifies one or more pieces of recommendation content among a plurality of pieces of content based on the second information generated by the second information generator 410 and the user's first information received from the first information input unit 430. In the second information, the plurality of items of predetermined content are assigned with the weighted values, and the weighted values are varied depending on the genres to which the corresponding content belongs. Therefore, when the genre is changed, the weighted value for the same item is changed. The second information-based processor 420 calculates similarities in items between each first content and content obtained from the first information (i.e., content viewed by a user) among the plurality of pieces of content, calculates scores according to the items by reflecting the weighted values according to the items of the first content to the calculated similarities, and obtains a total score according to the all the items, thereby calculating the recommendation scores of the first content. The second information-based processor 420 calculates the recommendation score based on such a method with respect to the plurality of pieces of content.

The second information-based processor 420 transmits one or more pieces of content, of which the recommendation score is high, among the plurality of pieces of content, as the recommendation content to the output unit 440.

The first information input unit 430 transmits the first information based on a user's view history of the electronic apparatus 100 to the second information-based processor 420. The first information input unit 430 generates the first information with a previously defined format so as to be input to the second information. The first information includes values of the plurality of items about one or more pieces of content viewed by a user, based on the user's view history. Further, the first information input unit 430 provides information (e.g., electronic program guide (EPG) information) about a plurality of pieces of content, which are providable to the electronic apparatus 100 in a current point in time, to the second information-based processor 420, so that the second information-based processor 420 can identify the recommendation content among the plurality of pieces of content based on the received information.

The output unit 440 outputs one or more pieces of recommendation content received from the second information-based processor 420. For example, the output unit 440 may display the UI 10 (see FIG. 2) for guiding the identified recommendation content.

The user tendency inferor 450 identifies features of content, which is highly preferred by a user, as an inference result based on the first information without being limited to a specific genre, separately from the second information-based processor 420. The inference result may for example include content, a genre, etc. which is highly preferred by a user (in other words, which a user has frequently viewed or spend a lot of time to view). The user tendency inferor 450 transmits the identified inference result to the second information-based processor 420 or the output unit 440, thereby serving as a filter for the identified recommendation content. For example, when thirty pieces of recommendation content are identified, the second information-based processor 420 may transmit twenty pieces of recommendation content to the output unit 440 except ten pieces of recommendation content which is less related to the features of the content based on the inference result from the user tendency inferor 450. Alternatively, the user tendency inferor 450 may be excluded.

Below, metadata of content will be described.

Figure 5:
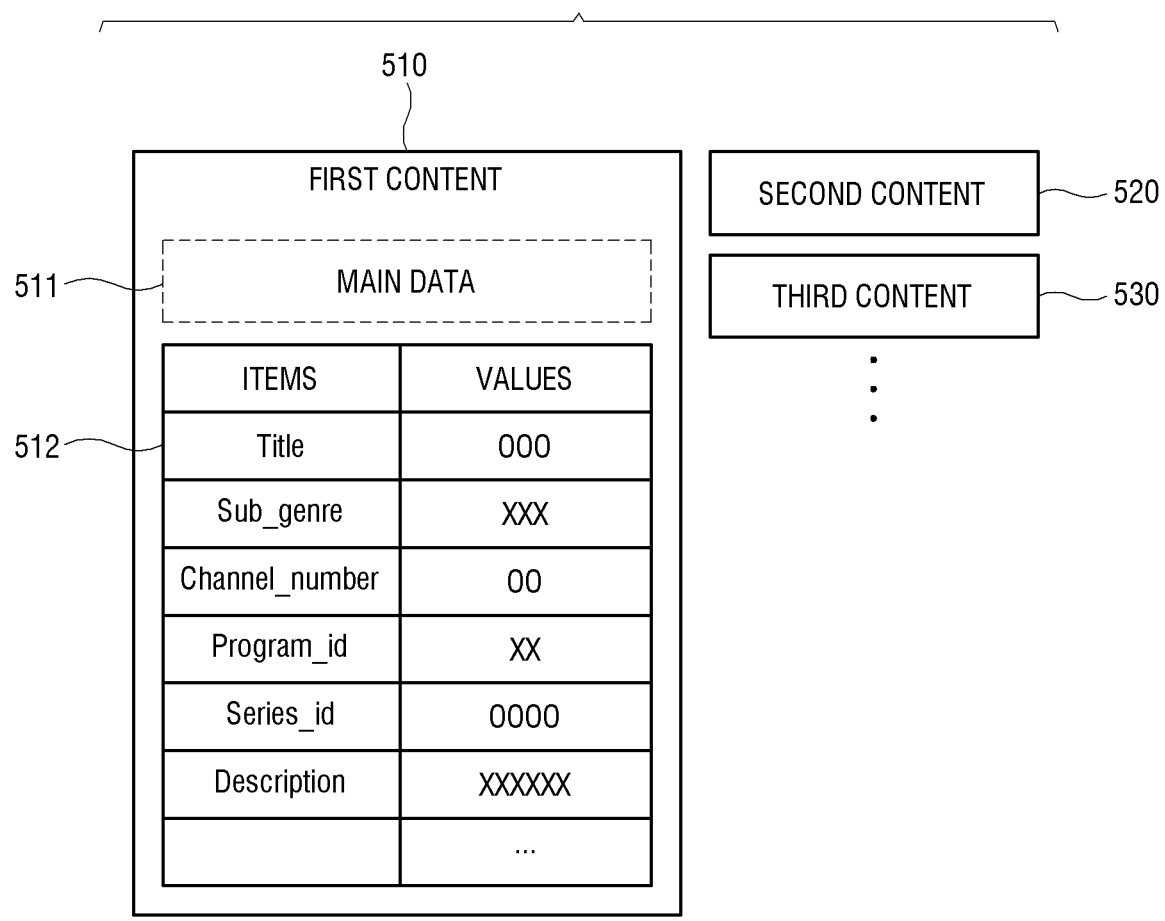
FIG. 5 illustrates each data structure of pieces of content according to an embodiment.

FIG. 5 illustrates a data structure of pieces of content.

As shown in FIGS. 1 and 5, a plurality of pieces of content, e.g., first content 510 and other content 520 and 530 available for the electronic apparatus 100 each includes main data 511 and metadata 512. In this embodiment, first content 510 will be described, but the description related to the other content 520 and 530 is equivalent to the first content 510. The main data 511 refers to the first content 510 itself, and includes moving-image data when the first content 510 is a moving image, image data when the first content 510 is an image, and game content data when the first content 510 is a game.

The metadata 512 includes various pieces of appended information about the main data 511, in other words, describing the main data 511. The metadata 512 includes a plurality of previously defined items, and values of the first content 510 with regard to the items, thereby showing the features of the first content 510. This embodiment illustrates some among the plurality of items, but does not restrict the kinds of items. For example, 'Title' indicates the title of the first content 510, 'Sub_genre' indicates the detailed genre of the first content 510, 'Channel_number' indicates a channel number on which the first content 510 is broadcasted, 'Program_id' is identification (ID) assigned to the first content 510, 'Series_id' is ID of series when the first content 510 belongs to a series, 'Description' indicates descriptions of the first content 510, etc. Besides, the metadata 512 may include values about various kinds of items. The metadata 512 including the values of the items can show the features of the first content 510. In this manner, the other pieces of other content 520 and 530 may also show the features of the other content 520 and 530.

Like this, the features of pieces of first content 510 and other content 520 and 530 are expressed with a plurality of values corresponding to the plurality of items, and are different in preference for the items according to the genres to which the first content 510 and other content 520 and 530 belongs (specifically, preference of multiple users who have viewed the first content 510 and other content 520 and 530 based on the big data of various user's view histories). Below, such an embodiment will be described.

FIG. 6 is a table showing features of preference according to genres of content, and items corresponding to the features.

As shown in FIG. 6, the content has various genres such as sports, news, movie, drama, entertainment, animation, music, etc. Further, one piece of content belongs to one genre. One piece of content may belong to a plurality of genres, and in this case, it is regarded that the content belongs to a representative one of the plurality of genres. Here, according to the big data based on various users' view histories, the features of the content, which are highly preferred by various users, are different according to the genres of the corresponding content.

For example, in a case of sports genre, features highly preferred by a user includes the specific kind of sports (baseball, soccer, basketball, etc.), a professional league of the sports (the professional soccer leagues of Korea, England, Germany, France, Spain, Italy, etc. in the case of soccer), the teams of the sports, etc. In a case of news genre, features highly preferred by a user includes a specific news program, a channel number of the news program, etc. In a case of drama genre, features highly preferred by a user include a series, a genre, etc.

Further, the features correspond to one or more items among the plurality of items of the metadata. In this case, one feature does not correspond to only one item, but multiple features may correspond to one item or one feature may correspond to multiple items. For example, the features of the series correspond to the item of 'series_id'. The features of the channel correspond to the item of 'channel_number'. The features of the program correspond to the features of 'title', and 'program_id'.

In result, every genre includes one or more items which are relatively highly preferred by various users. The items corresponding to a specific genre are items related to content highly preferred in the corresponding genre. For example, the items corresponding to the features highly preferred in the sports genre are 'sub_genre' and 'title'. The items corresponding to the features highly preferred in the drama genre are 'series_id' and 'sub_genre'. The items corresponding to the features highly preferred in the animation genre are 'series_id' and 'channel_number', 'title', and 'description'.

Thus, the item corresponding to the features highly preferred in the specific genre is weighted differently from the other items. For example, when certain content belongs to the sports genre, the weighted values assigned to 'sub_genre' and 'title' among the plurality of items are higher than those assigned to the other items. In the foregoing second information, the weighted values are assigned in this manner with respect to all pieces of content obtainable by the electronic apparatus 100. Below, it will be described by way of example that the weighted values in the second information are assigned according to the genres.

FIG. 7 is a table showing that items are weighted according to genres.

As shown in FIGS. 6 and 7, when there is a plurality of items such as 'sub_genre', 'program_id', 'series_id', 'title', 'channel_number' and 'description', the weighted values assigned to the items are different according to the genres. When there is a plurality of items which correspond to one genre (i.e., which are highly preferred in one genre), the items may be differently weighted according to preference. Only the items corresponding to one genre may be assigned with the weighted values, but the other items may also be assigned with the weighted values. When the weighted values are assigned to the other items, the weighted values assigned to the highly preferred item are higher than those assigned to the items that are not highly preferred.

For example, in a case of sports genre, the items 'sub_genre' and 'title' corresponding to the features of high preference are weighted with '0.5' and '0.2' respectively. In other words, the preference for the features corresponding to 'sub_genre' in the sports genre is higher than the preference for the features corresponding to 'title'. Subsequently, the item 'channel_number' related to the features of the next highest preference after the preference for 'sub_genre' and 'title' among the other items is weighted with '0.1'. Here, the weighted value is merely an example, and may be designed to be variously changed and decided. In a case of entertainment genre, the items 'series_id' and 'title' related to the features of the high preference are equally assigned with a weighted value of '0.5'. In other words, the preference for the features corresponding to 'series_id' in the entertainment genre is equal to the preference for the features corresponding to 'title'. In a case of animation genre, the items 'series_id', 'title', 'channel_number' and 'description' related to the features of the high preference are differentially assigned with weighted values of '0.4', '0.2', '0.2' and '0.1', respectively.

There are no limits to a method of assigning the weighted values. For example, a total of weighted values assigned to all the items may be set to '1', and the weighted values according to the items may be differently set based on the preference for the items. For example, in the case of entertainment genre, the items 'series_id' and 'title' may be assigned with the weighted value of '0.5', and the other items may be assigned with no weighted values.

The items of which the weighted values are not specified in the table of FIG. 7 may be assigned with the weighted values lower than the items of which the weighted values are specified, or may be assigned with no weighted values. For example, in the case of sports genre, the items 'program_id', 'series_id' and 'description' may be assigned with the weighted value of '0'.

FIG. 8 is a table showing an example of a user's view history of an electronic apparatus.

As shown in FIG. 8, the first information is generated based on a user's view history of the electronic apparatus 100, which is accumulated for a predetermined period of time. From metadata of various pieces of content viewed by a user, values corresponding to the items of the metadata are accumulated and tabulated according to the pieces of content. The user's view history includes a history of one or more pieces of content viewed by the user, and the first information may be an accumulation of metadata of multiple pieces of content viewed by the user. Therefore, the first information includes one or more values respectively corresponding to the plurality of items.

In this view history table of FIG. 8, a view start time, a view end time, a title (i.e., an item title), a genre (i.e., an item sub_genre), content ID (i.e., an item program_id), etc. of content viewed by a user are tabulated. In the table, one row refers to a history of viewing predetermined content once. One column in the table refers to values of multiple pieces of content corresponding to one item of metadata. For example, the first row in the table shows that a user viewed the content titled "OOOO Cup Playoff" in a genre of "hockey" and having the content ID of "ba000000000003933376" for about 30 minutes on Aug. 26, 2020.

Based on metadata of multiple pieces of content viewed by a user, multiple values corresponding to each item of the metadata may be tabulated into a table (because multiple pieces of content may have their own values in the same item). However, such data may not be necessarily stored in the form of a table in the actual electronic apparatus 100. The first information may be variously provided based on such a table or the like data.

For example, the electronic apparatus 100 may use metadata of one or more pieces of content having a view frequency higher than a threshold (e.g., one piece of content having the highest view frequency or a plurality of pieces of content having view frequencies higher than or equal to a predetermined ranking) as the first information.

Further, the electronic apparatus 100 may select one or more pieces of content among the plurality of pieces of content through genre filtering, and use the metadata of one or more pieces of selected content as the first information. For example, the electronic apparatus 100 may select content of a genre having the highest view frequency among multiple pieces of content included in a view history.

Thus, when the first information is given, the electronic apparatus 100 compares each of the multiple pieces of obtainable content with the first information, thereby identifying similarities between the items. Below, such an embodiment will be described.

Figure 9:
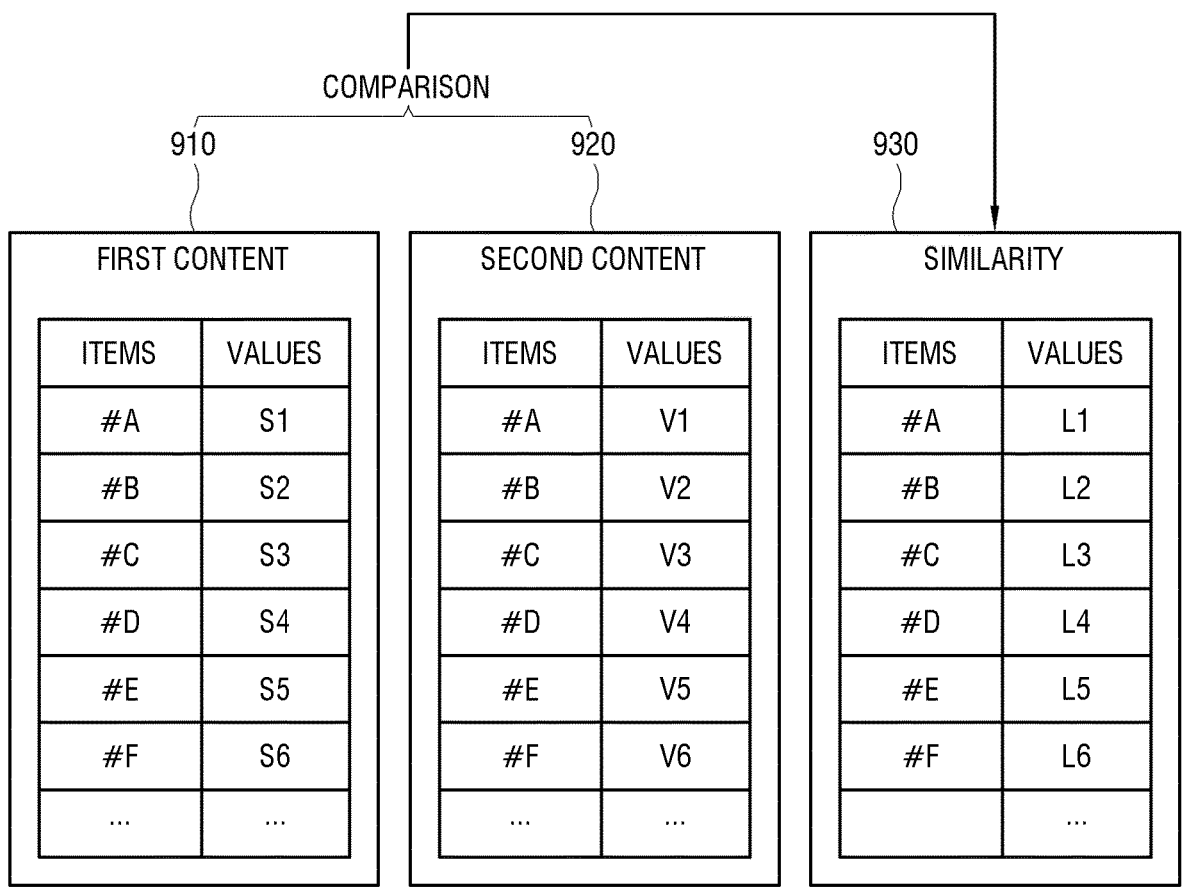
FIG. 9 illustrates a method of calculating similarity between recommendable content and viewed content according to items according to an embodiment.

FIG. 9 illustrates a method of calculating similarity between recommendable content and viewed content according to items.

As shown in FIGS. 1 and 9, it is possible to calculate similarities 930 in items between metadata 910 of predetermined first content among the multiple pieces of recommendable content obtainable by the electronic apparatus 100 and metadata 920 of predetermined second content viewed by a user in the first information. Because the metadata 910 of the first content includes values according to the plurality of items and likewise the metadata 920 of the second content also includes values according to the plurality of items, the electronic apparatus 100 can calculate the similarities 930 between two values of one item by comparing the two values.

For example, when values of the first content and values of the second content are given with respect to the plurality of items #A, #B, #C, #D, #E and #F, the electronic apparatus 100 compares the value of the first content and the value of the second content with respect to the same item. The electronic apparatus 100 compares a value S1 of the first content and a value V1 of the second content with respect to the item #A, thereby calculating a similarity L1 between S1 and V1 in the item #A. The electronic apparatus 100 compares a value S2 of the first content and a value V2 of the second content with respect to the item #B, thereby calculating a similarity L2 between S2 and V2 in the item #A. In the same manner, the electronic apparatus 100 calculates the similarities with respect to the other items. By calculating such similarities between the items, the similarity 930 between the first content and the second content is finally obtained.

The similarities between the two values according to the items may be calculated by various principles and methods. For example, when the values S1 and V1 of the item are given as numbers, the similarity L1 becomes higher as difference between two values S1 and V1 decreases, but becomes lower as the difference increases. When the values S1 and V1 of the item are given as a text or a binary code, the similarity L1 becomes higher as the two values S1 and V1 have more keywords or codes in common with each other, but becomes lower as they have fewer keywords or codes in common. When the two values S1 and V1 are projected as coordinates or vectors on the Euclidean plane, the similarity L1 becomes higher as a Euclidean distance between two coordinates or vectors respectively corresponding to the two values S1 and V1 gets shorter, but becomes lower as the Euclidean distance gets longer. In this way, the similarities between the two values according to the items can be obtained by any mathematical methods without limitations as long as the two values are expressed as quantitative numbers.

Figure 10:
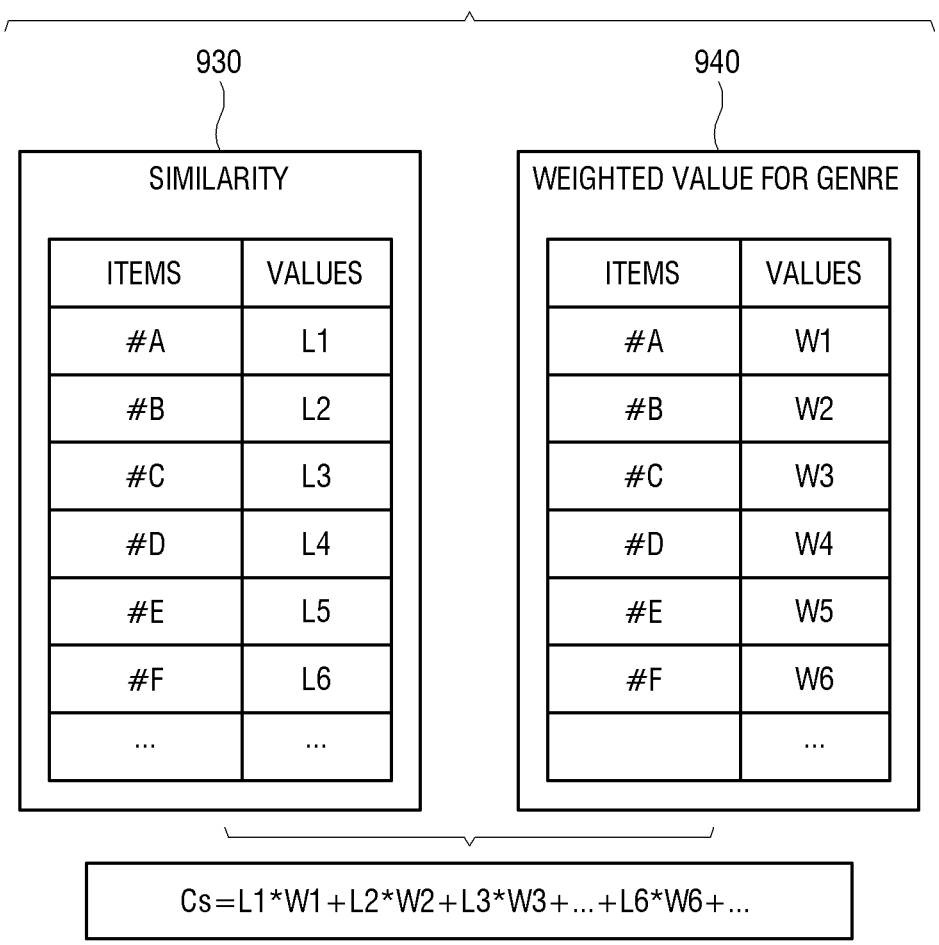
FIG. 10 illustrates a method of calculating a recommendation score of content by weighting the calculated similarity according to an embodiment.

FIG. 10 illustrates a method of calculating a recommendation score of content by weighting the calculated similarity.

As shown in FIGS. 1 and 10, the electronic apparatus 100 calculates the similarity 930 between the first content and the second content, and reflects a weighted value 940 according to the items corresponding to the genre of the first content, of which the recommendation score will be calculated, in the similarity 930. The weighted value 940 is provided in the second information. In other words, the electronic apparatus 100 calculates the recommendation score of certain content, based on the first information and the second information.

As described in the foregoing embodiment, the weighted values 940 are previously assigned to the plurality of items, respectively. The weighted value 940 has a unique numerical value corresponding to a specific genre by reflecting various users' preference in the genres, and the numerical value is changed when the genre is changed. The weighted value 940 assigned to each item is reflected in the similarity 930 of the corresponding item.

For example, the similarities 930 according to the items between the first content and the second content are L1 in the item #A, L2 in the item #B, L3 in the item #C, L4 in the item #D, L5 in the item #E, and L6 in the item #F. The weighted values 940 corresponding to the genre, to which the corresponding content belongs, are W1 in the item #A, W2 in the item #B, W3 in the item #C, W4 in the item #D, W5 in the item #E, and W6 in the item #F. In this case, the recommendation score Cs of the corresponding content can be calculated as follows.

$$Cs=(L1*W1)+(L2*W2)+(L3*W3)+(L4*W4)+(L5*W5)+(L6*W6)$$

In other words, the recommendation score may be expressed based on the sum of the similarities 930 of the items multiplied by the weighted values 940 of the corresponding items. When the number of items is N, the recommendation score Cs can be expressed as follows.

$$Cs=\Sigma(L_k*W_k); \text{(where, } k \text{ is an integer from 1 to } N\text{)}$$

In this way, the electronic apparatus 100 can calculate the recommendation scores of the plurality of pieces of obtainable content.

Such a method of calculating the recommendation scores may be varied depending on the types of the value according to the items included in the first information. In the foregoing example, there is one value according to the items of the first information (i.e., one piece of content included in the first information). However, on the contrary, there may be a plurality of values according to the items of the first information (i.e., multiple pieces of content included in the first information). In this case, a plurality of similarities is calculated by individually comparing the plurality of values according to the items of the first information with the value of the same item of the first content targeted for comparison, and summed by reflecting the weighted values in the plurality of similarities.

For example, when the first information has two values of S11 and S12 with regard to the item #A and the value of the first content is V1, the electronic apparatus 100 calculates a similarity L11 between S11 and V1, and a similarity L12 between S12 and V1. The electronic apparatus 100 reflects the weighted values according to the genres in the similarities like (L11+L12)*W1 with regard to the item #A. Further, when the first information has two values of S21 and S22 with regard to the item #B and the value of the first content is V2, the electronic apparatus 100 calculates a similarity L21 between S21 and V2, and a similarity L22 between S22 and V2. The electronic apparatus 100 reflects the weighted values according to the genres in the similarities like (L21+L22)*W2 with regard to the item #B. In this manner, results of reflecting the weighted values in all the items are summed (for example, (L11+L12)*W1+(L21+L22)*W2+ . . . ), thereby obtaining the recommendation score Cs.

When the recommendation scores of pieces of content are obtained, the electronic apparatus 100 identifies the recommendation content based on each obtained recommendation score among the plurality of pieces of content. The method of identifying the recommendation content is the same as described above.

Further, the electronic apparatus 100 may calculate the recommendation scores of the pieces of content by identifying content, which belongs to the same genre as that of the content viewed by a user in the first information, among the plurality of pieces of recommendable content, and comparing the identified content with the content viewed by the user in the first information. For example, when a view history included in the first information corresponds to a sports genre, the electronic apparatus 100 primarily identifies content, which belongs to the sports genre, among the plurality of pieces of recommendable content, and obtains the recommendation score of each identified content.

Alternatively, when the first information includes metadata of content of multiple genres, the electronic apparatus 100 may provide an environment for selecting metadata of a specific genre in the first information. Below, such an embodiment will be described.

Figure 11:
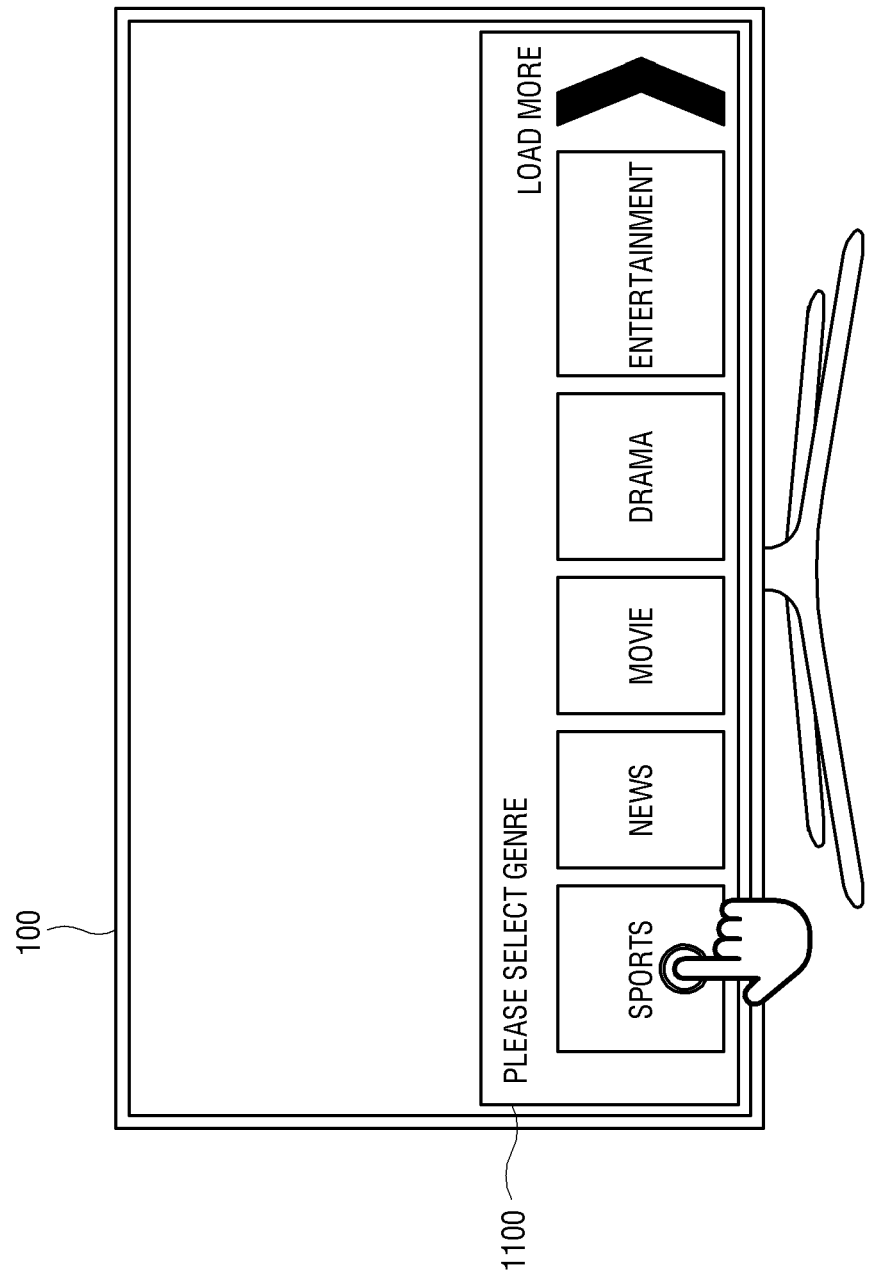
FIG. 11 illustrates that an electronic apparatus displays a UI for genre selection according to an embodiment.

FIG. 11 illustrates that an electronic apparatus displays a UI for genre selection.

As shown in FIG. 11, the electronic apparatus 100 displays a UI 1100 allowing a user to select one of a plurality of genres. The UI 1100 provides options for selecting one among the plurality of genres such as sports, news, movie, drama, entertainment, animation, music, etc.

When a certain genre is selected through the UI 1100, the electronic apparatus 100 obtains the first information about the content of the selected genre in the user's view history. The electronic apparatus 100 calculates each recommendation score of the plurality of pieces of obtainable content, based on the obtained first information. The electronic apparatus 100 identifies one or more pieces of recommendation content based on each calculated recommendation score of the content, and displays the UI 1100 to thereby guide the identified recommendation content.

The methods according to the foregoing embodiments may be achieved in the form of a program instruction that can be implemented in various computers, and recorded in a computer-readable medium. Such a computer-readable medium may include a program instruction, a data file, a data structure or the like, or combination thereof. For example, the computer-readable medium may be stored in a nonvolatile storage unit such as universal serial bus (USB) memory, regardless of whether it is deletable or rewritable, for example, a RAM, a ROM, a flash memory, a memory chip, an integrated circuit (IC) or the like memory, or an optically or magnetically recordable or machine (e.g., a computer)-readable storage unit medium, for example, a compact disk (CD), a digital versatile disk (DVD), a magnetic disk, a magnetic tape or the like. It will be appreciated that a memory, which can be included in a mobile terminal, is an example of the machine-readable storage unit medium suitable for storing a program having instructions for realizing the embodiments. The program instruction recorded in this storage unit medium may be specially designed and configured according to the embodiments, or may be publicly known and available to those skilled in the art of computer software. Further, the computer program instruction may be implemented by a computer program product.

What is claimed is:

1. An electronic apparatus comprising:
a processor configured to:
obtain information about weighted values respectively assigned to a plurality of items having values that represent content features of a plurality of pieces of content, wherein the weighted values are assigned as higher weight values to items corresponding to the content features preferred by a plurality of users according to genres of content among the plurality of items;
identify a user content viewed by a user of the electronic apparatus, based on a view history of the user;
calculate similarities in values of the plurality of items, respectively, between a plurality of pieces of recommendable content and the user content, respectively;
calculate recommendation scores of the plurality of pieces of content, based on the calculated similarities and the weighted values assigned to the items according to the genres; and
perform a recommendation operation for one or more content pieces, of which the calculated recommendation score is equal to or higher than a preset ranking, among the plurality of pieces of content.

2. The electronic apparatus according to claim 1, wherein the processor is further configured to:
calculate similarities by comparing values according to corresponding items among the plurality of items between a first content among the plurality of pieces of recommendable content and the user content;
identify the weighted values for the corresponding items; and
calculate a value, which is obtained by summing the similarities according to the corresponding items to which the identified weighted values are reflected, as a recommendation score of the first content.

3. The electronic apparatus according to claim 2, wherein a value of a first item among the corresponding items comprises a number, and a similarity according to the first item between the first content and the user content becomes higher as a difference between the value of the first item in the first content and the value of the first item in the user content decreases.

4. The electronic apparatus according to claim 2, wherein a value of a second item among the corresponding items comprises a text, and
a similarity according to the second item between the first content and the user content becomes higher as the value of the second item in the first content and the value of the second item in the user content have more keywords in common.

5. The electronic apparatus according to claim 1, wherein the processor is further configured to identify content, which has a highest view frequency among pieces of content included in the view history, as the user content.

6. The electronic apparatus according to claim 1, wherein the processor is further configured to identify a genre of which content has a highest view frequency among pieces of content included in the view history, and identify the content of the identified genre as the user content.

7. The electronic apparatus according to claim 1, further comprising a display,
wherein the processor is further configured to display, on the display, a user interface through which the one or more content pieces, of which the recommendation scores are ranked higher than or equal to the preset ranking, are provided to be selectable among the plurality of pieces of content.

8. The electronic apparatus according to claim 1, wherein the processor is further configured to identify the plurality of pieces of content based on electronic program guide information.

9. A method of controlling an electronic apparatus, the method comprising:
obtaining information about weighted values respectively assigned to a plurality of items having values that represent content features of a plurality of pieces of content, wherein the weighted values are assigned as higher weight values to items corresponding to the content features preferred by a plurality of users according to genres of content among the plurality of items;
identifying a user content viewed by a user of the electronic apparatus based on a view history of the user;
calculating recommendation scores of the plurality of pieces of content, based on similarities in values of the plurality of items, respectively, between a plurality of pieces of recommendable content and the user content, respectively, and the weighted values assigned to the items according to the genres; and
performing a recommendation operation for one or more content pieces, of which the calculated recommendation score is equal to or higher than a preset ranking, among the plurality of pieces of recommendable content.

10. The method according to claim 9, wherein the calculating the recommendation scores of the plurality of pieces of content further comprises:
calculating similarities by comparing values according to corresponding items among the plurality of items between a first content among the plurality of pieces of recommendable content and the user content;
identifying the weighted values corresponding to the corresponding items; and
calculating a value, which is obtained by summing the similarities according to the corresponding items to which the identified weighted values are reflected, as a recommendation score of the first content.

11. The method according to claim 10, wherein a value of a first item among the corresponding items comprises a number, and
a similarity according to the first item between the first content and the user content becomes higher as a difference between the value of the first item in the first content and the value of the first item in the user content decreases.

12. The method according to claim 10, wherein a value of a second item among the corresponding items comprises a text, and
a similarity according to the second item between the first content and the user content becomes higher as the value of the second item in the first content and the value of the second item in the user content have more keywords in common.

13. The method according to claim 9, wherein the identifying the user content further comprises:
identifying content, which has a highest view frequency among pieces of content included in the view history, as the user content.

14. The method according to claim 9, wherein the identifying the user content further comprises:
identifying a genre of which content has a highest view frequency among pieces of content included in the view history; and
identifying the content of the identified genre as the user content.

15. The method according to claim 9, wherein the performing the recommendation operation further comprises:
displaying a user interface through which the one or more content pieces, of which the recommendation scores are ranked higher than or equal to the preset ranking, are provided to be selectable among the plurality of pieces of content.

16. A non-transitory computer-readable storage medium having recorded thereon at least one instruction which, when executed by at least one processor, causes the at least one processor to execute a method for controlling an electronic apparatus, the method including:
obtaining information about weighted values respectively assigned to a plurality of items having values that represent content features of a plurality of pieces of content, wherein the weighted values are assigned as higher weight values to items corresponding to the content features preferred by a plurality of users according to genres of content among the plurality of items;
identifying a user content viewed by a user of the electronic apparatus based on a view history of the user;
calculating recommendation scores of the plurality of pieces of content, based on similarities in values of the plurality of items, respectively, between a plurality of pieces of recommendable content and the user content, respectively, and the weighted values assigned to the items according to the genres; and
performing a recommendation operation for one or more content pieces, of which the calculated recommendation score is equal to or higher than a preset ranking, among the plurality of pieces of recommendable content.

17. The non-transitory computer-readable storage medium according to claim 16, wherein the calculating the recommendation scores of the plurality of pieces of content further includes:
- calculating similarities by comparing values according to corresponding items among the plurality of items between a first content among the plurality of pieces of recommendable content and the user content;
- identifying the weighted values corresponding to the corresponding items; and
- calculating a value, which is obtained by summing the similarities according to the corresponding items to which the identified weighted values are reflected, as a recommendation score of the first content.

18. The non-transitory computer-readable storage medium according to claim 17, wherein a value of a first item among the corresponding items comprises a number, and
- a similarity according to the first item between the first content and the user content becomes higher as a difference between the value of the first item in the first content and the value of the first item in the user content decreases.

19. The non-transitory computer-readable storage medium according to claim 17, wherein a value of a second item among the corresponding items comprises a text, and
- a similarity according to the second item between the first content and the user content becomes higher as the value of the second item in the first content and the value of the second item in the user content have more keywords in common.

20. The non-transitory computer-readable storage medium according to claim 16, wherein the identifying the user content further includes:
- identifying content, which has a highest view frequency among pieces of content included in the view history, as the user content.

\* \* \* \* \*